(12) United States Patent
Kim et al.

(10) Patent No.: US 10,277,712 B2
(45) Date of Patent: Apr. 30, 2019

(54) APPARATUS AND METHOD FOR EXECUTING TASK OF ELECTRONIC DEVICE

(71) Applicant: Samsung Electronics Co., Ltd., Gyeonggi-do (KR)

(72) Inventors: Won-Jin Kim, Seoul (KR); Byoung-Ik Kang, Seoul (KR); Phil-Koo Yeo, Seoul (KR); Jin-Yong Jang, Gyeonggi-do (KR); Jin-Woo Kim, Gyeonggi-do (KR); Yong-Kwan Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/956,234

(22) Filed: Dec. 1, 2015

(65) Prior Publication Data

US 2016/0157221 A1 Jun. 2, 2016

(51) Int. Cl.
*H04W 4/60* (2018.01)
*H04W 4/70* (2018.01)
(Continued)

(52) U.S. Cl.
CPC ............ *H04L 67/322* (2013.01); *H04L 67/10* (2013.01); *H04L 67/1002* (2013.01);
(Continued)

(58) Field of Classification Search
CPC ............ H04W 4/028; H04W 52/0258; H04W 28/0215; H04W 28/0236; H04W 76/045;
(Continued)

(56) References Cited

U.S. PATENT DOCUMENTS 9,667,511 B2* 5/2017 Nielsen ............... H04L 41/5058
2004/0221080 A1 11/2004 Connor
(Continued)

FOREIGN PATENT DOCUMENTS

KR 10-2009-0088194 A 8/2009

OTHER PUBLICATIONS

International Search Report and Written Opinion issued for PCT/KR2015/012966 dated Mar. 8, 2016, 12 pgs.
(Continued)

*Primary Examiner* — Fred A Casca

(57) ABSTRACT

The present disclosure relates to a sensor network, machine type communication (MTC), machine-to-machine (M2M) communication, and technology for Internet of Things (IoT). The present disclosure provides intelligent services based on a variety of technologies, such as a smart home, a smart building, a smart city, a smart car, a connected car, a health care, a digital education, a smart retail, security and safety services. An apparatus and method for executing a task of an electronic device are provided. The apparatus includes a communication interface configured to receive state information associated with the electronic device from the electronic device, and a processor configured to determine whether to execute a specific task in the electronic device or a mobile terminal based on the state information about the electronic device and state information about the mobile terminal, and to indicate a result of the determination to the electronic device through the communication interface.

26 Claims, 15 Drawing Sheets

(51) Int. Cl.
  *H04L 29/08* (2006.01)
  *H04W 52/02* (2009.01)
(52) U.S. Cl.
  CPC ...... *H04L 67/1004* (2013.01); *H04L 67/1029* (2013.01); *H04W 4/60* (2018.02); *H04W 4/70* (2018.02); *H04W 52/0258* (2013.01)
(58) Field of Classification Search
  CPC ..... H04W 88/02; H04W 4/001; H04W 74/06; H04W 4/008
  USPC ...... 455/456.3, 434, 445, 452.1, 404.1, 405, 455/418, 456.2
  See application file for complete search history.

(56) References Cited

U.S. PATENT DOCUMENTS

| | | | |
|---|---|---|---|
| 2008/0043824 | A1 | 2/2008 | Jacobs et al. |
| 2009/0210578 | A1 | 8/2009 | Chung et al. |
| 2009/0271639 | A1 | 10/2009 | Burge et al. |
| 2010/0162382 | A1 | 6/2010 | Kim et al. |
| 2011/0045761 | A1 | 2/2011 | Rolf et al. |
| 2011/0214126 | A1* | 9/2011 | Sadovsky ............. G06F 9/5027 718/100 |
| 2011/0216681 | A1* | 9/2011 | Tao ....................... H04W 52/02 370/311 |
| 2012/0254492 | A1 | 10/2012 | Li et al. |
| 2013/0039203 | A1 | 2/2013 | Fong et al. |
| 2013/0151744 | A1 | 6/2013 | Gupta et al. |
| 2013/0290539 | A1* | 10/2013 | Kodialam ............. G06F 9/5072 709/226 |
| 2014/0122558 | A1 | 5/2014 | Azar |
| 2014/0143785 | A1 | 5/2014 | Mistry et al. |
| 2014/0258357 | A1* | 9/2014 | Singh .................... H04L 67/10 709/201 |
| 2015/0358810 | A1* | 12/2015 | Chao .................... H04W 4/001 455/418 |

OTHER PUBLICATIONS

Extended European Search Report dated Nov. 9, 2017, regarding Application No. EP15864669.5, 12 pages.

* cited by examiner

APPARATUS AND METHOD FOR EXECUTING TASK OF ELECTRONIC DEVICE

CROSS-REFERENCE TO RELATED APPLICATIONS AND CLAIM OF PRIORITY

The present application is related to and claims benefit under 35 U.S.C. § 119(a) of a Korean patent application filed in the Korean Intellectual Property Office on Dec. 1, 2014 and assigned Serial No. 10-2014-0169897, the entire disclosure of which is incorporated herein by reference.

TECHNICAL FIELD

The present disclosure relates to an apparatus and method for executing a task of an electronic device.

BACKGROUND

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and big data processing technology through connections with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, a machine type communication (MTC), and so forth have been recently researched.

Such an IoT environment may provide intelligent Internet technology services that create a new value to human life by collecting and analyzing data generated among connected things. An IoT may be applied to a variety of fields including a smart home, a smart building, a smart city, a smart car or connected cars, a smart grid, a health care, smart appliances and advanced medical services through convergence and combination between existing information technology (IT) and various industrial applications.

These days, mobile electronic devices require various network communications. In general, an electronic device executes a specific function and task according to a loaded program, such as a home appliance, an electronic note, a portable multimedia player (PMP), a mobile communication terminal, a tablet personal computer (PC), a video/audio device, a desktop/laptop computer, an in-vehicle navigator, and the like. For example, these electronic devices may collect or output sounds or images. Along with an increase in the integration level of electronic devices, the increasing popularity of ultra-high-speed, and large-capacity wireless communication, various functions have recently been loaded in a single electronic device. For this purpose, a performance of processors and batteries of electronic devices have been improved remarkably.

An electronic device may be configured so as to communicate and interwork with various other electronic devices. Due to emergence of various wearable devices implemented in the forms of a watch, glasses, a bracelet, a ring, and the like, communication needs to be conducted between various wearable devices and electronic devices. Furthermore, things interact with each other owing to the development of the IoT. Electronic devices support a variety of communication techniques and will interact with more communication devices in the future. More and more users use this environment.

Users demand faster network processing to use a variety of types of content. The users' demands impose much load on the main processor of an electronic device in a high-speed network environment. As a result, network performance may be decreased and overload of a main processor may cause heat and increased power consumption. To solve the problem, network processing techniques for processing a high-speed task more efficiently are under active study.

SUMMARY

To address the above-discussed deficiencies, it is a primary object to provide an apparatus and method for effectively utilizing the performance and power of electronic devices.

Another aspect of the present disclosure is to provide an apparatus and method for effectively executing a task of an electronic device.

Another aspect of the present disclosure is to provide an apparatus and method for allocating and processing a task to be executed by checking the device state and network state of each electronic device.

Another aspect of the present disclosure is to provide an apparatus and method for allocating a task generated in an electronic device to another device.

In accordance with an aspect of the present disclosure, there is provided an apparatus for executing a task of an electronic device. The apparatus includes a communication interface configured to receive state information associated with the electronic device from the electronic device, and a processor configured to determine whether to execute a specific task in the electronic device or a mobile terminal based on the state information associated with the electronic device and state information associate with the mobile terminal and to indicate a result of the determination to the electronic device through the communication interface.

In accordance with another aspect of the present disclosure, there is provided an apparatus for executing a task of an electronic device. The apparatus includes a communication interface configured to report state information associated with electronic device to a mobile terminal, and a processor configured to execute a task, upon receipt of a task execution indication from the mobile terminal, and to transmit data for the task to the mobile terminal to enable the mobile terminal to execute the task, if the task execution indication is not received from the mobile terminal.

In accordance with another aspect of the present disclosure, there is provided a method for executing a task of an electronic device. The method includes receiving state information associated with the electronic device from the electronic device, determining whether to execute a specific task in the electronic device or a mobile terminal based on the state information associated with the electronic device and state information about the mobile terminal, and indicating a result of the determination to the electronic device.

In accordance with another aspect of the present disclosure, there is provided a method for executing a task of an electronic device. The method includes reporting state information associated with the electronic device to a mobile terminal, executing a task, upon receipt of a task execution indication from the mobile terminal, and transmitting data for the task to the mobile terminal to enable the mobile terminal to execute the task, if the task execution indication is not received from the mobile terminal.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1A:
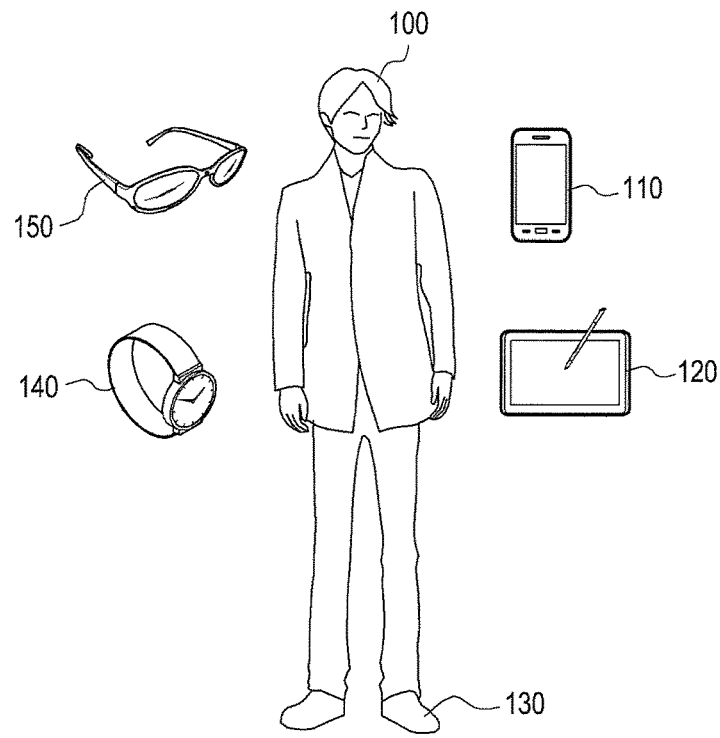
FIGS. 1A and 1B illustrate a network environment in which a plurality of electronic devices interact with each other according to an embodiment of the present disclosure.

FIGS. 1A through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, an electronic device may be at least one of a smart phone, a tablet personal computer (PC), a mobile phone, a video phone, an e-book reader, a desktop PC, a laptop PC, a netbook computer, a workstation, a personal digital assistant (PDA), a portable multimedia player (PMP), an MPEG-1 audio layer-3 (MP3) player, a mobile medical equipment, a camera, and a wearable device. For example, the wearable device may be at least one of smart glasses, a head-mounted device (HMD), electronic clothes, electronic shoes, an electronic bracelet, an electronic necklace, an electronic appcessory, an electronic tattoo, a smart mirror, and a smart watch.

According to some embodiments, an electronic device may be a smart home appliance. For example, the smart home appliance may be at least one of a television (TV), a digital versatile disk (DVD) player, audio equipment, a refrigerator, an air conditioner, a vacuum cleaner, an oven, a micro oven, a washer, an air purifier, a set-top box, a home automation control panel, a security control panel, a TV box (such as, Samsung HomeSync™, Apple TV™, Google TV™, or the like), a game console (such as, Xbox™, PlayStation™, or the like), an electronic dictionary, an electronic key, a camcorder, and an electronic picture frame.

According to other embodiments, an electronic device may be at least one of a medical device (such as, a portable medical measurer (a blood sugar meter, a hear rate sensor, or a body temperature thermometer), a magnetic resonance angiography (MRA) device, a magnetic resonance imaging (MRI) device, a computed tomography (CT) device, an imaging device, an ultrasonic device, or the like), a navigation device, a global positioning system (GPS) receiver, an event data recorder (EDR), a flight data recorder (FDR), an automotive infotainment device, a naval electronic device (such as, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, an Internet of Things (IoT) (such as, a lighting, a sensor, an electricity or gas meter, a sprinkler, a fire alarm, a thermostat, a lamp post, a toaster, a fitness tool, a hot water tank, a heater, a boiler, and the like).

According to some embodiments, an electronic device may be at least one of furniture, part of a building/structure, an electronic board, an electronic signature receiving device, a projector, or various measuring devices (such as, water, electricity, gas or electro-magnetic wave measuring devices), that include communication functionality.

According to various embodiments, an electronic device according to the present disclosure may be one or a combination of two or more of the foregoing devices. According to some embodiments, an electronic device may be a flexible device. In addition, it will be apparent to one having ordinary skill in the art that an electronic device according to the present disclosure includes, not limited to the foregoing devices, a new electronic device to emerge owing to technology development.

Now a description will be given of an electronic device according to various embodiments of the present disclosure with reference to the attached drawings. The term 'user' used in the present disclosure may refer to a person or device using an electronic device (such as, an artificial intelligence electronic device).

Figure 1B:
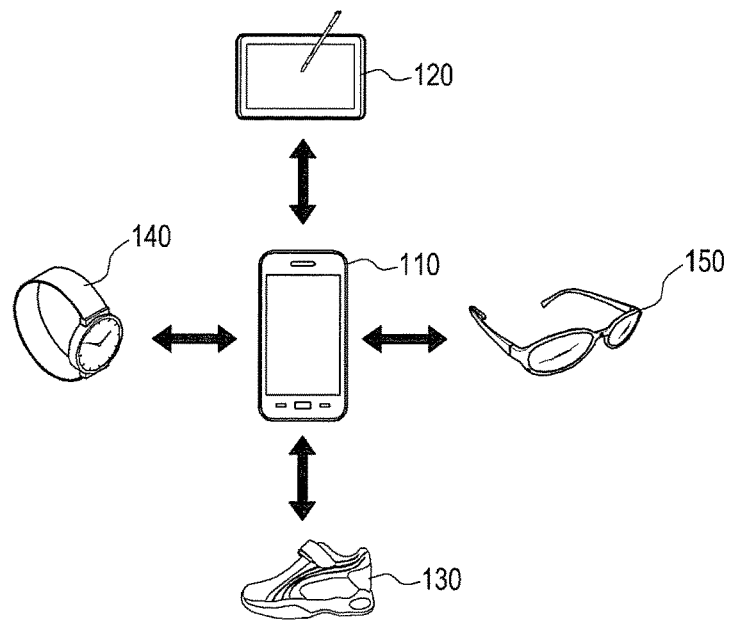

FIGS. 1A and 1B illustrate a network environment in which a plurality of electronic devices interacts with each other according to an embodiment of the present disclosure.

Referring to FIG. 1A, a user 100 uses a mobile terminal 110 such as a smart phone and a tablet PC 120 such as a smart tablet, and uses a plurality of wearable devices such as smart sneakers 130, a smart watch 140, and smart glasses 150. In addition, the user 100 is connected to an IoT (not shown) around the user 100. These wearable devices 130, 140, and 150 and the IoT are used in connection to the mobile terminal 110 or an electronic device such as the smart tablet 120.

Referring to FIG. 1B, communication is conducted among various electronic devices including the mobile terminal 110, the smart tablet 120, and the wearable devices 130, 140, and 150. The electronic devices 110, 120, 130, 140, and 150 communicate with one another directly or through a specific device, for example, the mobile terminal 110. For example, network communication is conducted continuously between the wearable devices 130, 140, and 150 and the mobile terminal 110. Further, each electronic device executes various tasks automatically or upon user request, when needed. The tasks includes, for example, capturing an image by a camera in the smart glasses 150, and tracking the location of the user 100 and displaying the current location of the user 100 and a map image in the smart watch 140. A task is executed autonomously in an electronic device or through network communication with another electronic device. Accordingly, there is a need for effectively processing and managing communication among the electronic devices 110, 120, 130, 140, and 150.

Figure 2:
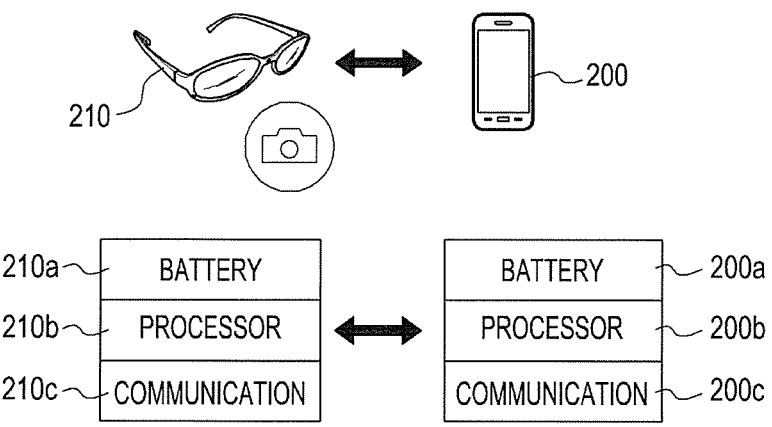
FIG. 2 illustrates an interaction between a mobile terminal and smart glasses according to an embodiment of the present disclosure.

FIG. 2 illustrates interaction between a mobile terminal and smart glasses according to an embodiment of the present disclosure. Referring to FIG. 2, the smart glasses 210 have a function of capturing an image and provide captured image data to the mobile terminal 200. However, the number, speed, and use or non-use of network communications varies according to the situation of each wearable device 130, 140, or 150. Each electronic device differs in battery consumption, residual battery power, and the computation capability of a processor. Furthermore, each electronic device operates at a different communication speed according to a different communication scheme.

The mobile terminal 200 manages its state, that is, a battery capacity 200a, processor performance 200b, and a communication state 200c. Similarly, the smart glasses 210 manage its state, that is, at least one of a battery capacity 210a, processor performance 210b, and a communication state 210c.

For example, the mobile terminal 200 achieves the highest of the communication rates of electronic devices which are connected to the mobile terminal 200 over a mobile communication network or a wireless fidelity (WiFi) network and interact with the mobile terminal 200. In another example, the smart glasses 210 have a low battery capacity and low computation capability relative to the mobile terminal 200.

To effectively use various electronic devices that form a network and process data and a task generated from the network, an intelligent network processor is provided.

Figure 3:
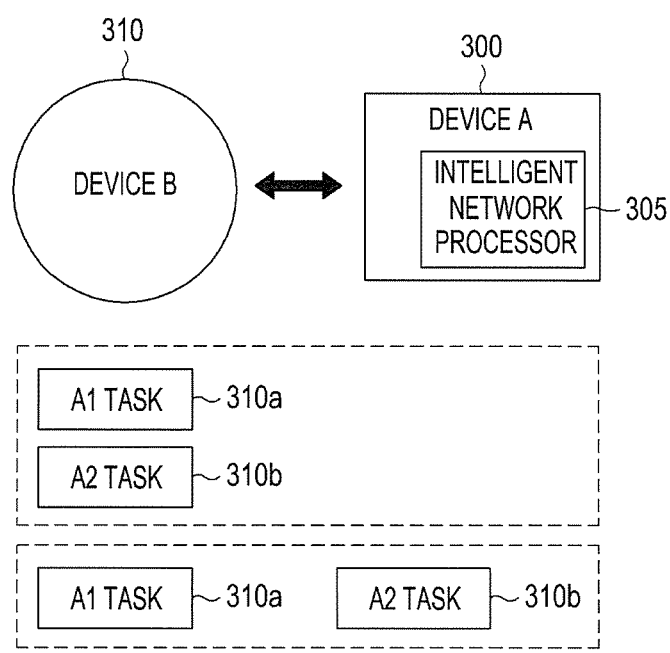
FIG. 3 illustrates a structure of an electronic device including an intelligent network processor according to an embodiment of the present disclosure.

FIG. 3 illustrates the structure of an electronic device including an intelligent network processor according to an embodiment of the present disclosure.

Referring to FIG. 3, an intelligent network processor 305 is implemented and developed as an application processor (AP) in a device A 300 having relatively high performance, for example, a mobile terminal such as a smart phone. The intelligent network processor 305 monitors and manages a device B 31, such as a wearable device, interacting with the device A 300 and process data and a task generated from the device B 310. In the illustrated example, the device B 310 generates an A1 task 310*a* and an A2 task 310*b*. The A1 task 310*a* is executed directly by the device B 310, whereas the A2 task 310*b* is processed by the device A 300. The intelligent network processor 305 of the device A 300 determines a device that will execute a specific task, for example, the A2 task 310*b*. For this purpose, the intelligent network processor 305 collects state information about each device. The state information may include information about at least one of a residual battery power, processor performance, and a communication state.

Referring to the example of FIG. 2, the smart glasses 210 are configured to capture a video, encode the captured video, and transmit the encoded video to the mobile terminal 200. A video process performed by the smart glasses 210 is divided into a video capturing task and a video encoding task. However, the video encoding task requires a large computation capability and much power consumption. Therefore, it is necessary to determine whether the smart glasses 210 or the mobile terminal 200 may effectively execute the video encoding.

The determination is made according to the situation of each device. For example, if both the smart glasses 210 and the mobile terminal 200 have sufficient residual battery powers and similar central processing unit (CPU) performance, the smart glasses 210 execute the video encoding. On the other hand, if the smart glasses 210 have an insufficient residual battery power or an inferior CPU performance and the mobile terminal 200 has a sufficient residual battery power, it is efficient to execute the video encoding and data storage in the mobile terminal 200.

The intelligent network processor 305 checks the battery states, processor performance (such as computation capabilities), and communication states of the interacting devices, allocates a task to a specific device, and processes data of the task. The intelligent network processor 305 perceives the state of each device connected to a network and store information about the state. Furthermore, the intelligent network processor 305 determines how to allocate and process a specific task on the stored information about the state of each device.

Figure 4:
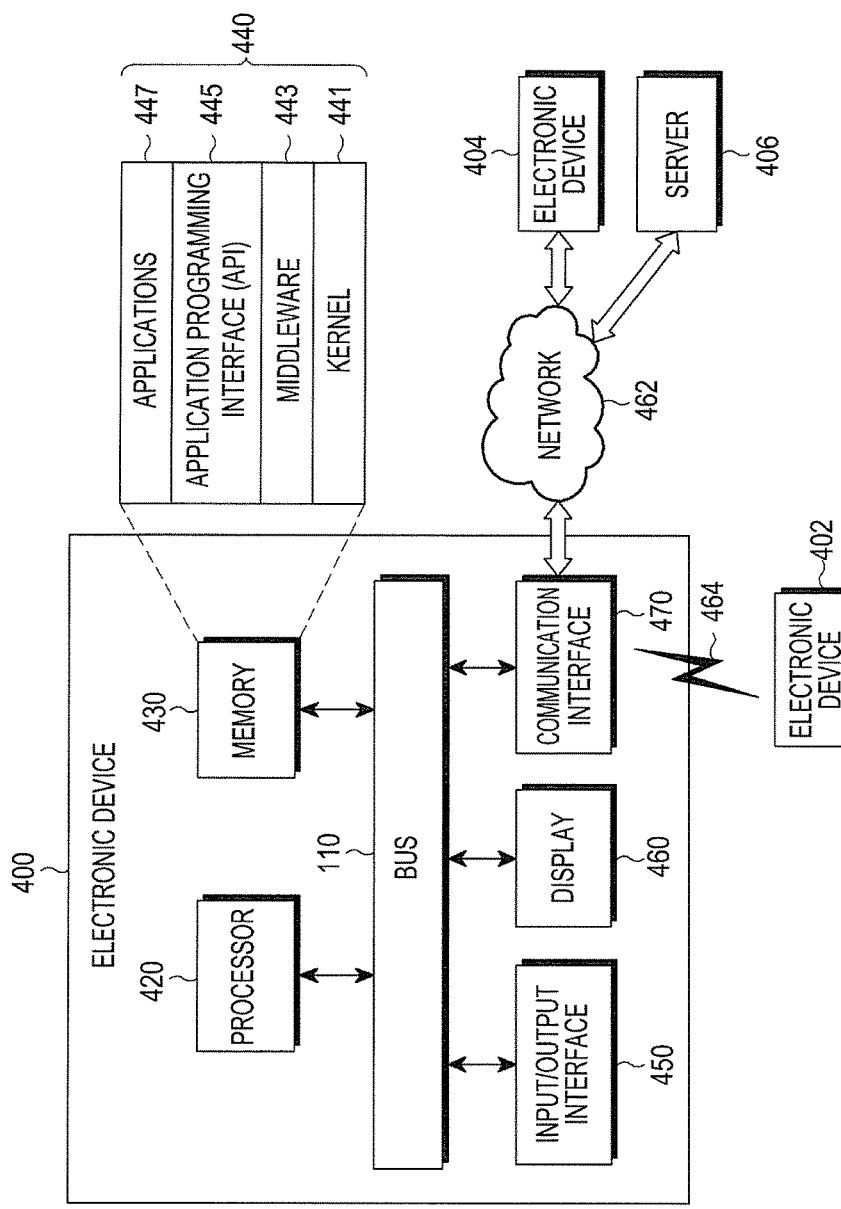
FIG. 4 is a block diagram illustrating a network environment including an electronic device according to an embodiment of the present disclosure.

FIG. 4 is a block diagram illustrating a network environment including an electronic device according to an embodiment of the present disclosure.

Referring to FIG. 4, an electronic device 400 includes at least one of a bus 410, a processor 420, a memory 430, an input/output (I/O) interface 450, a display 460, and a communication interface 470. In an embodiment, at least one of the components may be omitted in or a component is added to the electronic device 400.

The bus 410 includes a circuit that interconnects the foregoing components 410 to 470 and allows communication (such as, control messages and/or data) between the foregoing components 410 to 470. The processor 420 includes one or more of a CPU, an application processor (AP), and a communication processor (CP). The processor 420, for example, executes computation or data processing related to control and/or communication of at least one other component of the electronic device 400.

The memory 430 includes a volatile memory and/or a non-volatile memory. The memory 430, for example, stores instructions or data related to at least one other component of the electronic device 400. According to an embodiment, the memory 430 stores software and/or programs 440. The programs 440 includes, for example, a kernel 441, middleware 443, an application programming interface (API) 445, and/or application programs (or applications) 447. At least a part of the kernel 441, the middleware 443, or the API 445 is called an operating system (OS).

The kernel 441 controls or manages system resources (such as, the bus 410, the processor 420, or the memory 430) that are used in executing operations or functions implemented in other programs such as the middleware 443, the API 445, or the application programs 447. Also, the kernel 441 provides an interface for allowing the middleware 443, the API 445, or the application programs 447 to access and control or manage individual components of the electronic device 400.

The middleware 443 serves as a medium through which the kernel 441 communicates with the API 445 or the application programs 447 to transmit and receive data. Also, the middleware 443 performs control operations (such as, scheduling or load balancing) in regard to work requests by at least one of application programs 447 by, for example, assigning priorities for using system resources (the bus 410, the processor 420, or the memory 430) of the electronic device 400 to the at least one application program 447.

The API 445 is an interface that controls functions that the application programs 447 provide at the kernel 441 or the middleware 443. For example, the API 445 includes at least one interface or function (such as, a command) for file control, window control, video processing, or text control.

The I/O interface 450 acts as an interface that provides a command or data received from a user or an external device to the other component(s) of the electronic device 400. Furthermore, the I/O interface 450 outputs a command or data received from the other component(s) to the user or the external device.

The display 460 includes, for example, a liquid crystal display (LCD), a light emitting diode (LED) display, an organic LED (OLED) display, a microelectromechanical systems (MEMS) display, or an electronic paper display. The display 460 displays, for example, various types of content (such as, text, an image, a video, an icon, or a symbol) to the user. The display 460 includes a touch screen and receives, for example, a touch input, a gesture input, a proximity input, or a hovering input through an electronic pen or a user's body part.

The communication interface 470 establishes communication between the electronic device 400 and an external device, for example, a first electronic device 402, a second electronic device 404, or a server 406. For example, the communication interface 470 is connected to a network 462 by wireless or wired communication and communicates with the external device, for example, the second electronic device 404 or the server 406, over the network 462.

The wireless communication may be conducted using, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM)), as a cellular communication protocol. The wireless communication includes short-range communication technologies such as Bluetooth, Zigbee, and WiFi. The wired communication may be conducted in conformance to, for example, at least one of universal serial bus (USB), high definition multimedia interface (HDMI), recommended standard 232 (RS-232), or plain old telephone service (POTS). The network 462 is a communication network, for example, at least one of a computer network (such as, local area network (LAN) or wide area network (WAN)), the Internet, and a telephone network.

Each of the first and second external electronic devices 402 and 404 is of the same type as or a different type from the electronic device 400. For example, at least one of the first and second external electronic devices 402 and 404 are a wearable device such as smart sneakers, a smart watch, and smart glasses. The first external electronic device 402 establishes a communication with the electronic device 400 in conformance to a short-range communication scheme such as Bluetooth, Zigbee, and WiFi. The second external electronic device 404 establishes a communication with the electronic device 400 through the communication network 462.

According to an embodiment, a part or all of tasks executed in the electronic device 400 is executed by one or more other electronic devices (such as the electronic devices 402 and 404 or the server 406). According to an embodiment, when the electronic device 400 is to execute a task or a service automatically or upon request, the electronic device 400 requests at least a partial function related to the task or the service to another device (such as the electronic device 402 or 404, or the server 406), instead of autonomously executing the task or the service or additionally. The device (such as, the electronic device 402 or 404, or the server 406) executes the requested task or additional function and provide the result of the task or function execution to the electronic device 400. The electronic device 400 processes the received result as it is or additionally and provide the requested function or service to the user. For this purpose, cloud computing, distributed computing, or client-server computing is used.

While the electronic device 400 is shown in FIG. 4 as having the communication interface 470 and thus communicating with the external electronic device 404 or the server 406 through the network 462, the electronic device 404 is configured to operate independently with the communication functionality.

According to an embodiment, the electronic device 400 executes all or a part of tasks requested by one or more other electronic devices (such as, the electronic devices 402 and 404). If another electronic device, for example, the first electronic device 402 is to execute a task or a service automatically or upon request, the first electronic device 401 requests at least a partial function related to the task or the service to the electronic device 400, instead of autonomously executing the task or the service or additionally. The electronic device 400 executes the requested task or additional function and provides the result of the task or function execution to the first electronic device 402. The first electronic device 402 processes the received result as it is or additionally and provide the requested function or service to a user. Whether the first electronic device 402 or the electronic device 400 is to execute a requested task is predetermined or determined by the processor 420 of the electronic device 400. For example, the processor 420 of the electronic device 400 is provided with an intelligent network processor to check the states of other electronic devices connected to a network and process data.

Figure 5:
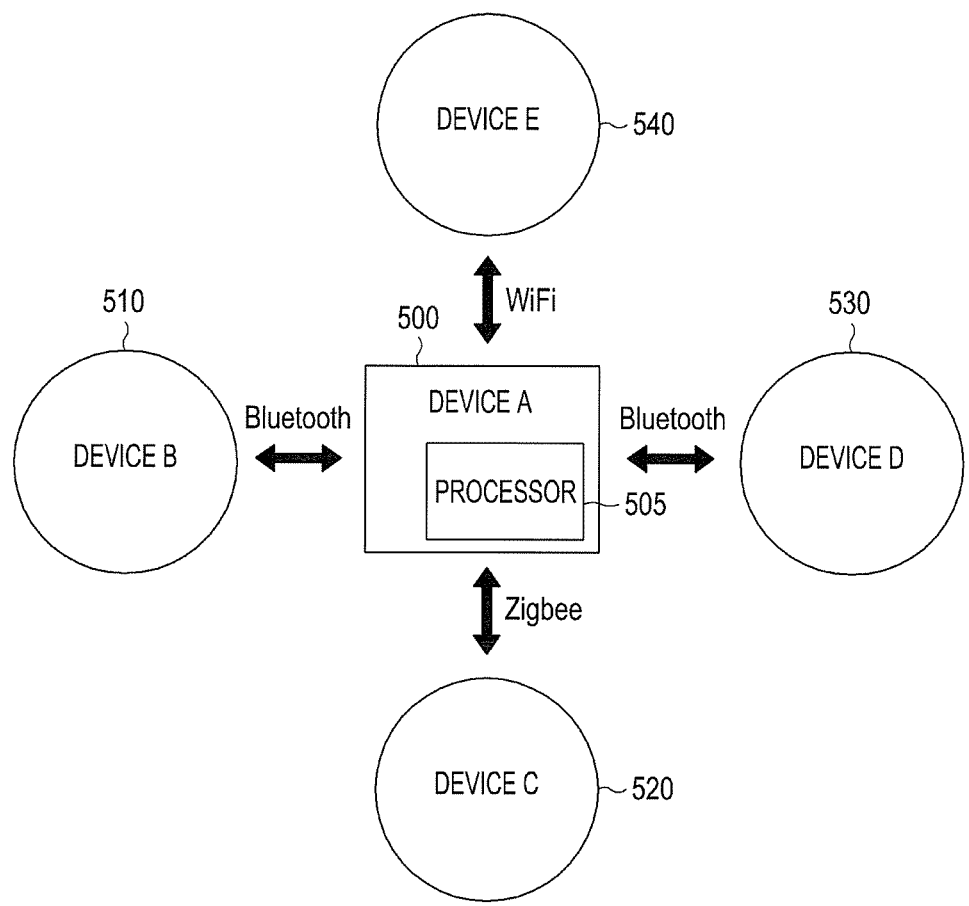
FIG. 5 illustrates a configuration of electronic devices connected to a network according to an embodiment of the present disclosure.

FIG. 5 illustrates a configuration of electronic devices connected to a network according to an embodiment of the present disclosure.

Referring to FIG. 5, devices B, C, D, and E 510, 520, 530, and 540 are connected to a device A 500. The devices B, C, D, and E 510, 520, 530, and 540 are be connected to the device A 500 in communication schemes conforming to different network protocols. For example, the device B 510 and the device D 530 are connected to the device A 500 by Bluetooth, the device C 520 is connected to the device A 500 by Zigbee, and the device E 540 is connected to the device A 500 by WiFi. The device A 500 is connected to another electronic device and/or a mobile communication network. For example, the electronic devices B, C, D, and E 510, 520, 530, and 540 are configured as wearable devices or an IoT, and the device A 500 may be a smart phone, a tablet PC, a laptop PC, or the like.

The device A 500 checks the states of the electronic devices 510 to 540 connected to the network and determine a device to process a task generated from the device A 500 or a specific electronic device. The above function is performed by an intelligent network processor 505 of the device A 500.

The intelligent network processor 505 plays the following roles.

Check the device state of an electronic device connected to a network.

The intelligent network processor 505 checks the battery state of an electronic device connected to the network. The battery state is, for example, battery consumption and/or a residual battery power. The intelligent network processor 505 checks the processor performance of the electronic device connected to the network. The processor performance refers to a computation capability. For example, the processor performance is a CPU clock speed a bus speed, and/or an initial benchmark performance evaluation. The intelligent network processor 505 checks the communication state of the electronic device. The communication state is determined based on at least one of the number of interrupt requests (IRQs) introduced to the electronic device, the amount of transmission data, and information about a device type.

Check network state per electronic device.

The intelligent network processor 505 checks a network state per electronic device. Specifically, the intelligent network processor 505 determines at least one of the number of electronic devices connected to the network, the distance to each connected electronic device, and the use period of each connected electronic device.

Task allocation and data processing based on device state.

The intelligent network processor 505 determine an electronic device to process an intended task based on the checked device states and performs scheduling by applying a weight per electronic device to the determination result. For example, if a battery first policy of the device B 510 is applied, a task of processing all or most of data generated in the device B 510 is determined to be processed in the device A 500 and scheduled accordingly.

Change network protocol.

Each electronic device conducts data communication in conformance to a different network protocol. The intelligent network processor 505 is responsible for conversion between different network protocols. In the case of WiFi tethering, for example, the intelligent network processor 505 converts data incoming from a long term evolution (LTE) mobile communication network to the device A 500 to data in a WiFi format. As the intelligent network processor 505 processes network protocol conversion, the load of a main CPU can be reduced and a network process speed is increased.

Process network data.

The intelligent network processor 505 is configured to process a data checksum or a cyclic redundancy check (CRC) check which requires a large computation capability, on behalf of the CPU. Also, the intelligent network processor 505 may execute a function of reducing IRQs in network data.

Figure 6:
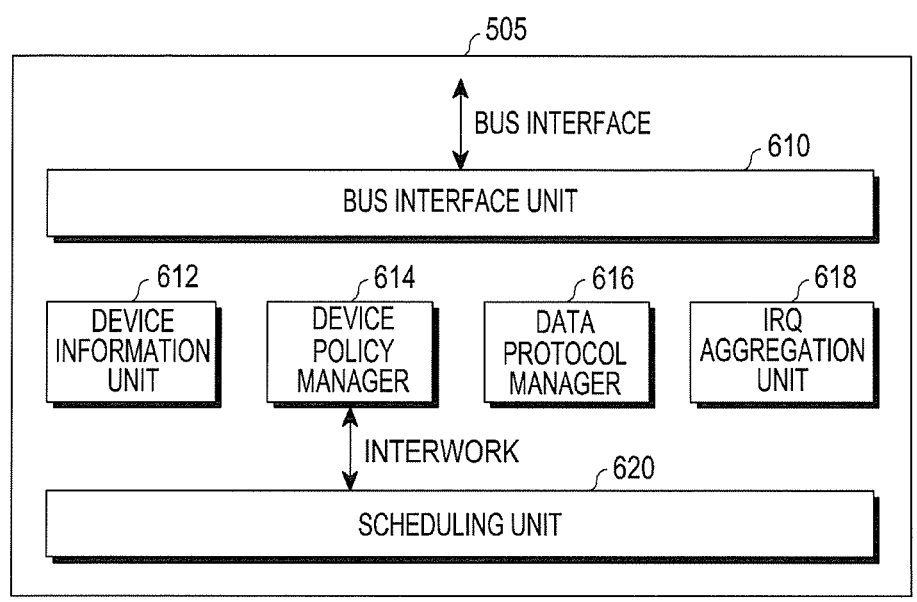
FIG. 6 is a functional block diagram of an intelligent network processor according to an embodiment of the present disclosure.

FIG. 6 is a functional block diagram of an intelligent network processor according to an embodiment of the present disclosure.

Referring to FIG. 6, the intelligent network processor 505 resides in an AP of the device A 500 and is connected to another electronic device using a network protocol such as WiFi, Bluetooth, Zigbee, LTE, or the like and an internal bus of the AP.

A bus interface unit 610 is responsible for a function of receiving network data. A device information unit 612 stores and manages information about the device state of each electronic device connected to a network. A device policy manager 614 allocates a task for data processing using the information about device states stored in the device information unit 612 and determines an electronic device to process the task. A scheduling unit 629 processes a task allocated to a specific electronic device by the device policy manager 614 according to a priority level. A data protocol manager 616 executes a function of conversion between different network protocols, and an IRQ aggregation unit 618 executes a function of aggregating and processing IRQs generated during input of network data.

In an embodiment, when an electronic device is initially connected to another electronic device, upon receipt of a request for task allocation from the other electronic device, or in response to installation of an application or a setting for interaction with the other electronic device, the electronic device allocates a task for processing data generated in the other electronic device. In an embodiment, the electronic device collects, store, and manage information about the device states and/or network states of all electronic devices connected to a network, periodically or aperiodically. In another embodiment, the electronic device receives information about the device state and/or network state of another electronic device, along with a request for task allocation from the other electronic device.

Figures 7A, 7B:
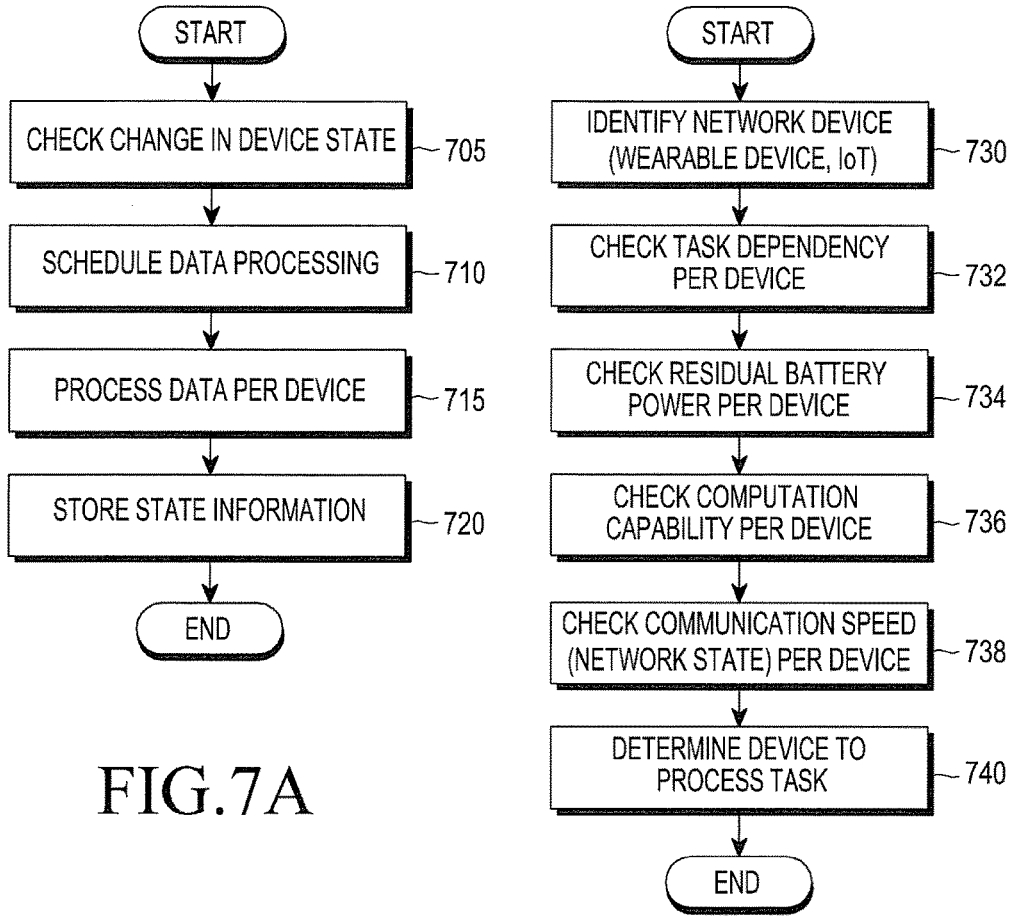
FIG. 7A is a flowchart illustrating a task allocation procedure in an electronic device according to an embodiment of the present disclosure.
FIG. 7B is a another flowchart illustrating a task allocation procedure in an electronic device according to an embodiment of the present disclosure.

FIG. 7A is a flowchart illustrating a task allocation procedure in an electronic device according to an embodiment of the present disclosure. The task allocation procedure is performed in a device that processes task allocation of electronic devices, for example, a mobile terminal such as a smart phone or a tablet PC.

Referring to FIG. 7A, the mobile terminal checks the state of at least one connected electronic device and the state of the mobile terminal and determines whether to process a requested task in the electronic device or the mobile terminal in step 705.

According to an embodiment, the mobile terminal receives state information about one or more electronic devices connected to a network, periodically or aperiodically. The state information about an electronic device includes information about at least one of the battery state, processor performance, and communication state of the electronic device. According to another embodiment, when the mobile terminal is initially connected to an electronic device, the mobile terminal acquires information about the performance of the electronic device from the electronic device or a server of the network. According to another embodiment, the mobile terminal receives state information about an electronic device along with a request for allocation of a specific task from the electronic device.

According to an embodiment, the mobile terminal determines whether to allocate a specific task based on state information about the mobile terminal. For example, if the residual battery power of the mobile terminal is decreased to or below a predetermined threshold, the mobile terminal determines that it is necessary to allocate a specific task being executed in the mobile terminal to another electronic device.

According to an embodiment, when the mobile terminal is initially connected to a specific electronic device, the mobile terminal determines whether to execute a task for data generated in the electronic device.

In step 710, the mobile terminal schedules data processing according to a weight per electronic device based on the determination. Specifically, the mobile terminal determines an electronic device that will execute the task according to the weights of the electronic devices connected to the network.

In step 715, the mobile terminal instructs the electronic device to process the data of the task according to the scheduling. According to an embodiment, the mobile terminal transmits a task execution indication to the electronic device to which the task has been allocated so that the electronic device may process the data of the task. According to another embodiment, the mobile terminal receives the data of the task from the electronic device and processes the received data.

In step 720, the mobile terminal stores information about the state of the electronic device and/or the state of the mobile terminal in relation to the processed task.

FIG. 7B is a detailed flowchart illustrating the task allocation procedure 705 according to an embodiment of the present disclosure.

Referring to FIG. 7B, the mobile terminal identifies at least one electronic device connected to a network and collects state information about the electronic device in step 730. The electronic device is, for example, a wearable device or an IoT. The state information includes information about at least one of a battery state, processor performance, and a communication state. In an embodiment, the mobile terminal receives information about the battery states and communication states of one or more electronic devices connected to a network, periodically or aperiodically. In an embodiment, when the mobile terminal is connected to each electronic device or performs a setting for using an electronic device, the mobile terminal acquires information about the processor performance of the electronic device from the electronic device or a server of the network.

In step 732, the mobile terminal checks task dependency on an electronic device basis. Specifically, the mobile terminal determines whether a task generated in a specific electronic device is executed only in the specific electronic device or can also be executed in the mobile terminal. Additionally, the mobile terminal separately identifies a function that the electronic device should execute and a function that is allocated to and processed in another electronic device (or the mobile terminal).

In step 734, the mobile terminal checks the residual battery power of each electronic device or the electronic device that has generated the task to be processed, according to the collected state information. In step 736, the mobile device checks the processor performance, that is, computation capability of each electronic device or the electronic device that has generated the task to be processed, when needed. The mobile terminal checks the communication state, that is, communication speed of each electronic device or the electronic device that has generated the task to be processed according to the collected state information, when needed in step 738.

In step 740, the mobile terminal determines an electronic device or the mobile terminal to execute the task based on at least one piece of information in the checked information.

For example, the mobile terminal determines that a device A, a device B, or the mobile terminal is to execute a task generated in the device A. In an embodiment, the mobile terminal additionally considers weights set for each electronic device and the mobile terminal to allocate the task.

The following exemplary criteria are used for task allocation.

User policy

The mobile terminal determines a device that will process a specific task according to a user-defined policy. The user policy is set on a device basis or a task basis. For example, if a device A and a device B are connected to a network and the device A selects a battery first policy, the mobile terminal may allocate a task to the device B so that the device B processes data of the task, in order to minimize data processing of the device A.

Network state-based policy

The mobile terminal determines a device that will process a specific task by checking and comparing the states of connected electronic devices. For this purpose, the devices are compared in terms of residual battery power, computation capability, and communication speed. Network state-based weights may be assigned to the comparison items on a device basis or a task basis. For example, the network state-based weights are assigned in consideration of the use period of the mobile terminal, the number of devices connected to the mobile terminal, and the distance between the mobile terminal and each electronic device. The mobile terminal determines a device that will process the data of the specific task by comparing per-device states to which weights have been applied.

Figure 8:
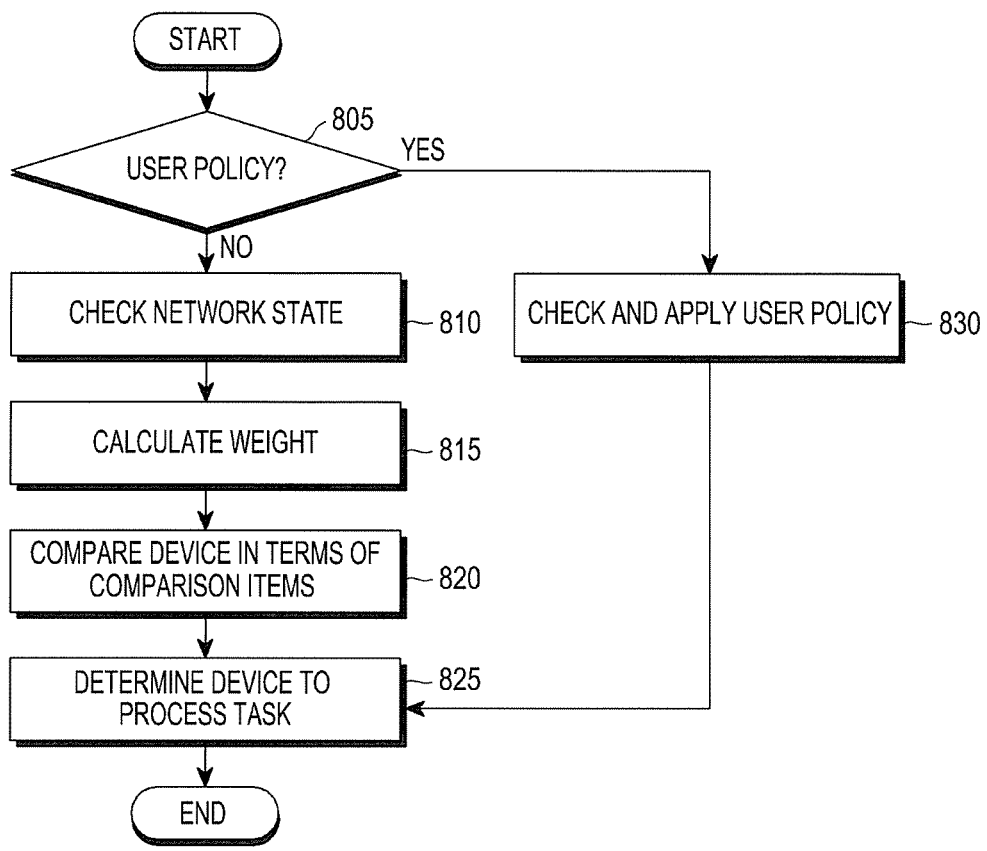
FIG. 8 is a flowchart illustrating a procedure for allocating a task by applying a user policy and a network state according to an embodiment of the present disclosure.

FIG. 8 is a flowchart illustrating a procedure for allocating a task by applying a user policy and a network state according to an embodiment of the present disclosure. The illustrated procedure is performed by a device that processes task allocation for electronic devices, for example, a mobile terminal such as a smart phone or a tablet PC.

Referring to FIG. 8, the mobile terminal determines whether there is a predetermined user policy in step 805. For example, the user policy is a battery first policy or a computation capability first policy. In the presence of a predetermined user policy, the mobile terminal checks the user policy and then checks the state of a device according to the user policy in step 830. In step 825, the mobile terminal determines a device that will execute a specific task by applying the user policy. For example, if the battery first policy is set, the mobile terminal allocates the task to a device (or mobile terminal) having a highest residual battery power.

On the other hand, in the absence of a predetermined user policy, the mobile terminal checks the network states of all connected electronic devices, one or more electronic devices capable of the specific task, or an electronic device that has generated the specific task in step 810. The network state of an electronic device is determined based on at least one of, for example, the use period of the mobile terminal, the number of devices connected to the mobile terminal, and the distance between the electronic device and the mobile terminal. The mobile terminal calculates a weight according to the network state of each electronic device in step 815 and checks each comparison item in step 820. In step 825, the mobile terminal determines a device (or mobile terminal) that will process the specific task according to the network state-based comparison items in step 825.

Table 1 below illustrates an example of task allocation according to weights of electronic devices A and B.

TABLE 1

|  | Device A | Device A | Device B | Device B | Weight application (A:B) | Weight x difference |
|---|---|---|---|---|---|---|
| Residual battery power | 50% | Xa = 1 | 70% | Xb = 1 | 50 < 70 | 20 (select B) |
| CPU use rate | 20% | Ya = 1 | 30% | Yb = 1 | 20 < 30 | 10 |

Although the device A has a lower CPU use rate, the device A has a larger weighted difference (=20) between residual battery powers than a weighted difference (=10) between CPU use rates in the above example. Therefore, a task to be processed is allocated to the device B from the viewpoint of residual battery power.

Table 2 illustrates an example of task allocation according to weights of electronic devices B and C.

TABLE 2

|  | Device C | Device C | Device B | Weight B | Weight application (C:B) | Weight x difference |
|---|---|---|---|---|---|---|
| Residual battery power | 50% | Xa = 1 | 65% | Xb = 1 | 50 < 65 | 15 |
| CPU use rate | 40% | Ya = 2 | 50% | Yb = 2 | 40 < 100 | 60 (select C) |

Although the device B has a higher residual battery power, the device B has a larger weighted difference (=60) between CPU use rates than a weighted difference (=15) between residual battery powers. Therefore, a task to be processed is allocated to the device C from the viewpoint of CPU use rate.

Figure 9:
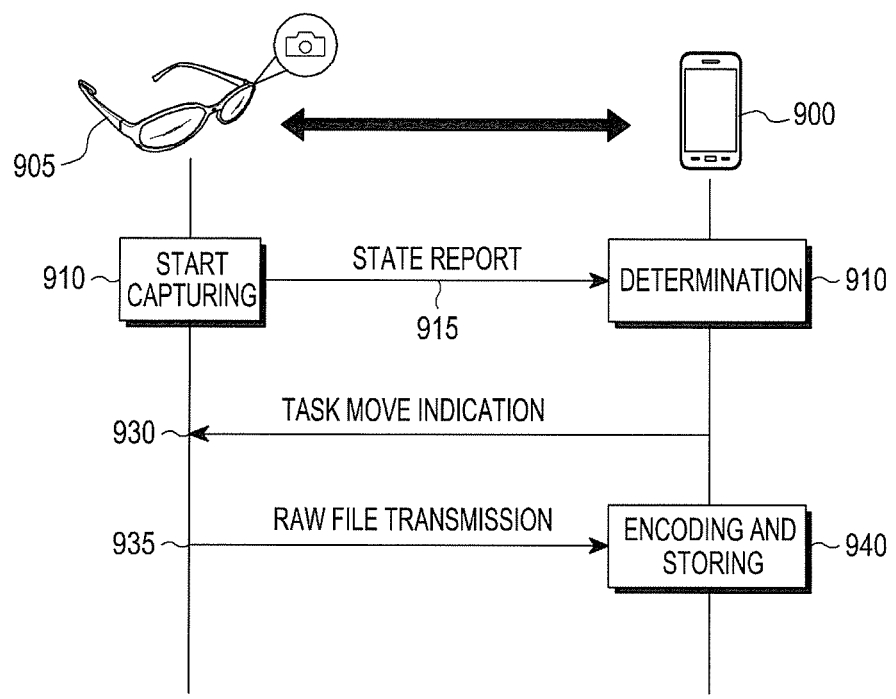
FIG. 9 illustrates a configuration of encoding an image captured by smart glasses according to an embodiment of the present disclosure.

FIG. 9 illustrates a scenario of encoding an image captured by smart glasses according to an embodiment of the present disclosure.

Referring to FIG. 9, a mobile terminal 900 is connected to smart glasses 905 by short-range communication. The smart glasses 905 start to capture an image according to a user input or a predetermined trigger condition in step 910. When the smart glasses 905 start to capture an image, the smart glasses 905 report its state information to the mobile terminal 900 in step 915. The state information includes information about at least one of the battery state, processor performance, and communication state of the smart glasses 905. In an embodiment, the smart glasses 905 determine whether to report its state information to the mobile terminal 900 according to the state information. For example, if the residual battery power of the smart glasses 905 is less than a predetermined threshold or the CPU use rate of the smart glasses 905 is larger than a predetermined threshold, the smart glasses 905 reports the state information to the mobile terminal 900 in order to request the mobile terminal 900 to encode the image captured by the smart glasses 905.

In step 920, the mobile terminal 900 may determine a device that encodes the image based on the state information about the smart glasses 905. For example, the mobile terminal 900 determines whether the mobile terminal 900 or the smart glasses 905 will encode the image captured by the smart glasses 905, taking into account at least one of a weight and a user policy of the smart glasses 905 in addition to the state information about the smart glasses 905 and state information about the mobile terminal 900. Upon receipt of a request for the encoding task from the smart glasses 905, the mobile terminal 900 may accept or reject the request according to the state of the mobile terminal 900.

If the mobile terminal 900 determines to execute the encoding task, the mobile terminal 900 indicates to the smart glasses 905 that the mobile terminal 900 executes the encoding task by transmitting a task move indication to the smart glasses 905. The smart glasses 905 are aware that data of the image should be transmitted to the mobile terminal 900 in response to the task move indication. Then, the smart glasses 905 transmit the data of the image collected by capturing the image in a RAW file to the mobile terminal 900 in step 935. The RAW file means uncoded data. For example, the smart glasses 905 transmit the RAW file in a predetermined period, according to the size of the data of the captured image, or upon completion of the image capturing.

In step 940, the mobile terminal 900 encodes the RAW file and stores or plays back the encoded file.

While not shown, when the smart glasses 905 are initially connected to the mobile terminal 900, the smart glasses 905 asks the mobile terminal 900 whether the encoding task is to be executed, and the mobile terminal 900 determines a device that executes the encoding task according to the performance of the mobile terminal 900 and the smart glasses 905 in another embodiment.

In another embodiment, upon initial sensing of a connection to the smart glasses 905, upon receipt of a user request for changing a setting, or upon installation of an application for interaction with the smart glasses 905, the mobile terminal 900 determines whether the mobile terminal 900 or the smart glasses 905 are to execute the task of encoding the image captured by the smart glasses 905.

Figure 10:
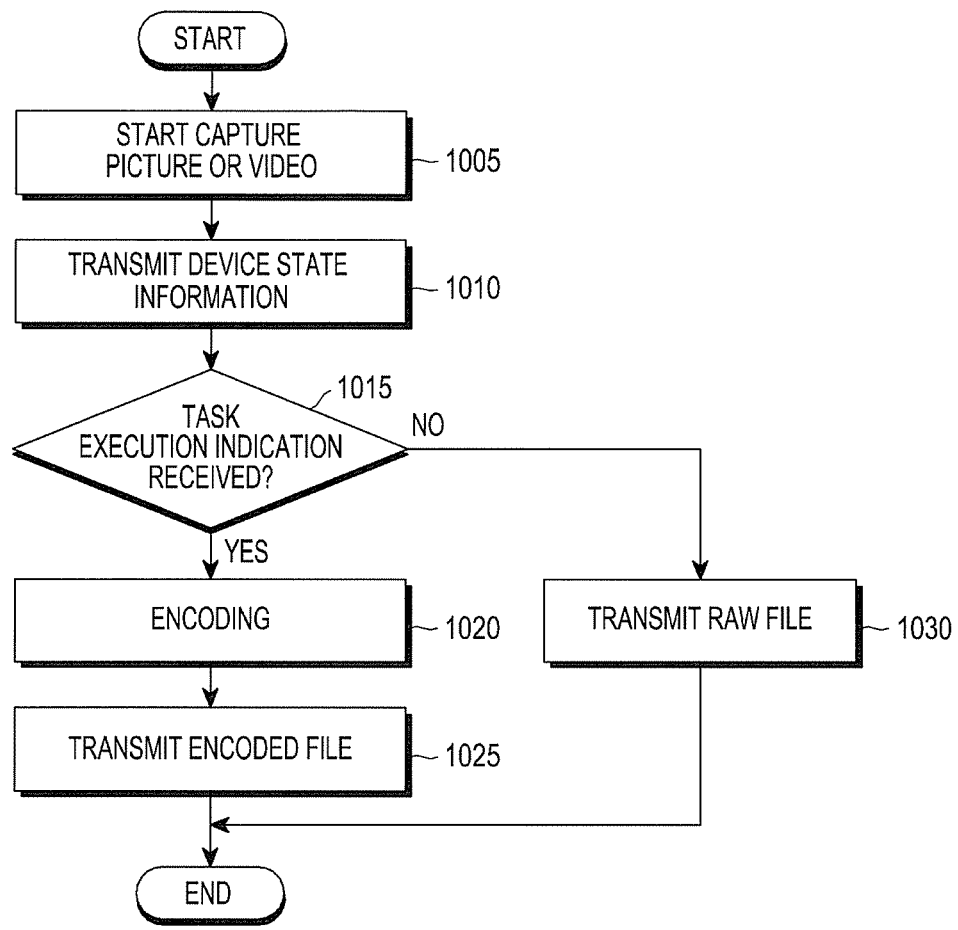
FIG. 10 is a flowchart illustrating an operation of an electronic device that captures an image according to an embodiment of the present disclosure.

FIG. 10 is a flowchart illustrating an operation of an electronic device that captures an image according to an embodiment of the present disclosure. In the illustrated example, the electronic device is smart glasses or another wearable device which has a camera module.

Referring to FIG. 10, the electronic device starts to capture an image such as a picture or a video in step 1005 and reports its state information to a mobile terminal in step 1010. In step 1015, the electronic device determines whether a task execution indication has been received from the mobile terminal. If the task execution indication has not been received or a task move indication has been received, the electronic device transmits a RAW file of the captured image to the mobile terminal in step 1030.

On the other hand, upon receipt of the task execution indication, the electronic device encodes the image in step 1020. In step 1025, the electronic device stores the encoded image or transmits the encoded image to the mobile terminal FIG. 11 is a flowchart illustrating an operation of a mobile terminal for executing a task of encoding an image according to an embodiment of the present disclosure.

Figure 11:
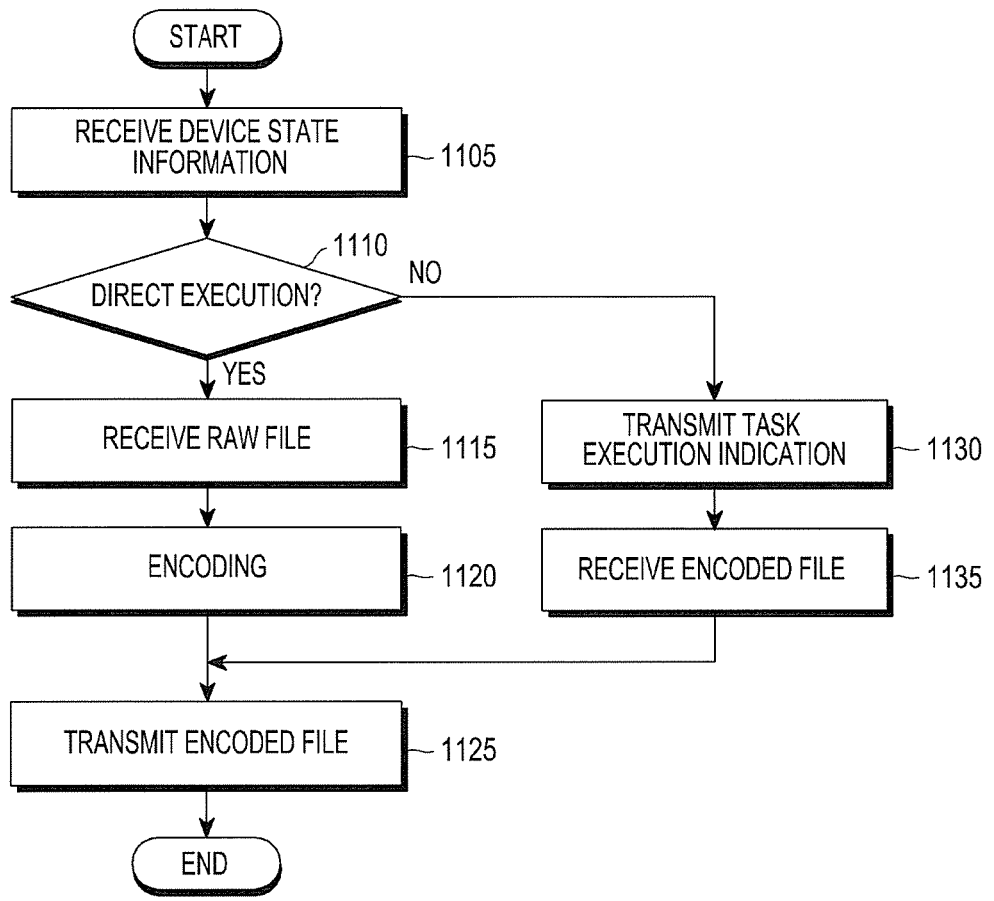
FIG. 11 is a flowchart illustrating an operation of a mobile terminal for executing an image encoding task according to an embodiment of the present disclosure.

Referring to FIG. 11, the mobile terminal receives state information from an electronic device interacting with the mobile terminal through a network in step 1105. The state information is received together with a request for executing an image encoding task. In step 1110, the mobile terminal determines whether to execute the encoding task directly, in consideration of the state of the mobile terminal and the state of the electronic device. If determining to execute the encoding task directly, the mobile terminal awaits reception of a RAW field of the image from the electronic device in step 1115. Upon receipt of the RAW file, the mobile terminal encodes the image of the RAW file in step 1120. In step 1125, the encoded image is stored or played back in the mobile terminal or may be provided to the electronic device. While not shown, if the mobile terminal determines to execute the encoding task directly, the mobile terminal transmits a task move indication to the electronic device.

On the other hand, if the mobile terminal determines not to execute the encoding task directly, the mobile terminal transmits a task execution indication to the electronic device in step 1130. The mobile terminal receives an encoded file including the encoded image from the electronic device in step 1135 and the encoded image is stored or played back in the mobile terminal in step 1140.

Figure 12:
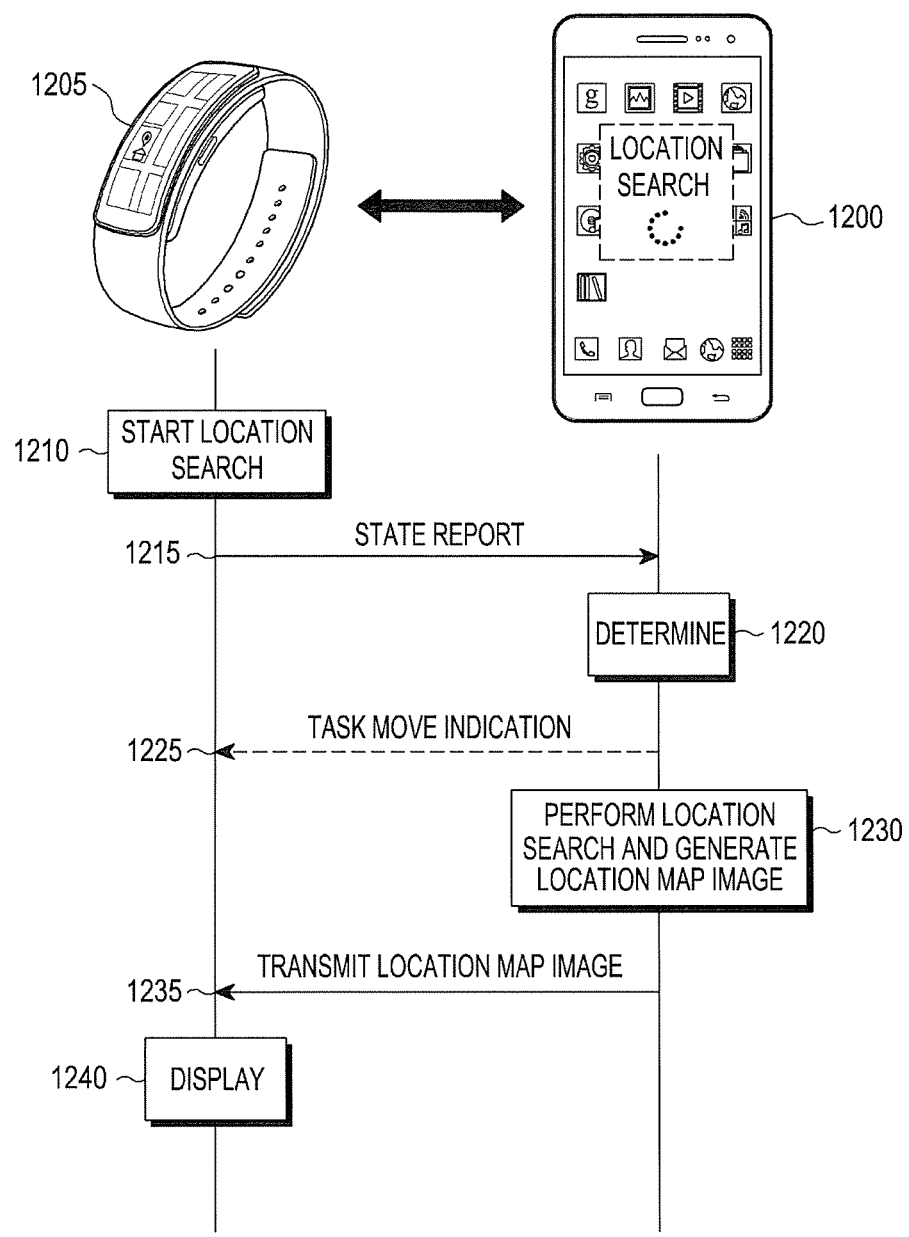
FIG. 12 illustrates an example of executing a location search task in a smart watch according to an embodiment of the present disclosure.

FIG. 12 illustrates a scenario of performing a location search in a smart watch according to an embodiment of the present disclosure.

Referring to FIG. 12, a mobile terminal 1200 is connected to a smart watch 1205 by short-range communication. In step 1210, the smart watch 1205 starts a location search according to a user input or a predetermined trigger condition. When the smart watch 1205 starts the location search, the smart watch 1205 reports its state information to the mobile terminal 1200 in step 1215. The state information includes information about at least one of the battery state, processor performance, and communication state of the smart watch 1205. In an embodiment, the smart watch 1205 determines whether to report its state information to the mobile terminal 1200 according to the state information. For example, if the residual battery power of the smart watch 1205 is less than a predetermined threshold or the CPU use rate of the smart watch 1205 is larger than a predetermined threshold, the smart watch 1205 reports the state information to the mobile terminal 1200 in order to request the mobile terminal 1200 to perform a location search.

In step 1225, the mobile terminal 1200 determines a device that performs a location search based on the state information about the smart watch 1205. For example, the mobile terminal 1200 determines whether the mobile terminal 1200 or the smart watch 1205 performs a location search, taking into account at least one of a weight of the smart watch 1205 and a user policy in addition to the state information about the smart watch 1205 and state information about the mobile terminal 1200. Upon receipt of a request for a location search from the smart watch 1205, the mobile terminal 1200 accepts or rejects the request according to the state of the mobile terminal 1200.

If the mobile terminal 1200 determines to execute the location search task, the mobile terminal 1200 transmits a task move indication to the smart watch 1205 in step 1225. In step 1230, the mobile terminal 1200 determines a current location and generates a map image corresponding to the current location in step 1230. In step 1235, the mobile terminal 1200 transmits information about the current location and the map image to the smart watch 1205 in step 1235, and the smart watch 1205 displays the current location and the map image in step 1240.

While not shown, when the smart watch 1205 is initially connected to the mobile terminal 1200, the smart watch 1205 asks the mobile terminal 1200 whether the location search task is to be executed, and the mobile terminal 1200 determines a device that will execute the location search task according to the performance of the mobile terminal 1200 and the smart watch 1205 in another embodiment.

In another embodiment, upon initial sensing of a connection to the smart watch 1205, upon receipt of a user request for changing a setting, or upon installation of an application for interaction with the smart watch 1205, the mobile terminal 1200 determines whether the mobile terminal 1200 or the smart watch 1205 is to execute the task of determining a location and generating a map image.

Figure 13:
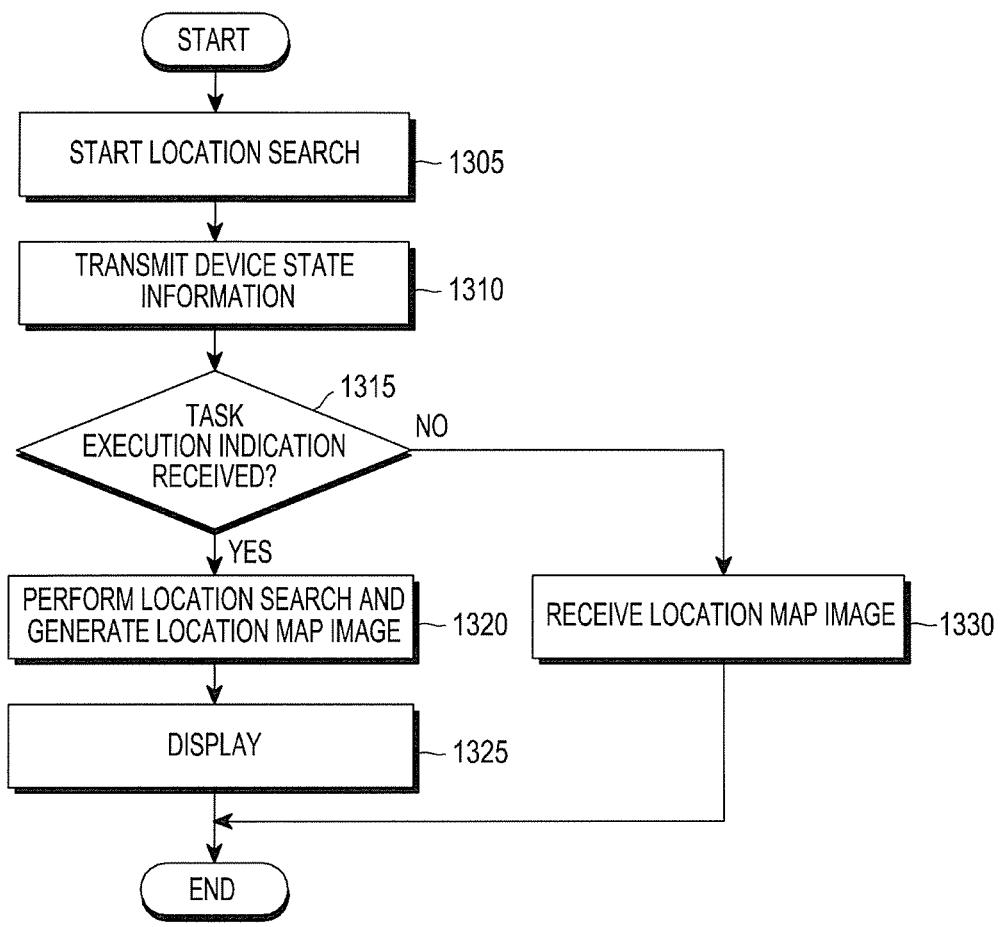
FIG. 13 is a flowchart illustrating an operation of an electronic device for executing a location search task according to an embodiment of the present disclosure.

FIG. 13 is a flowchart illustrating an operation of an electronic device that executes a location search task according to an embodiment of the present disclosure. In the illustrated example, the electronic device is a smart watch or another wearable device which has a location measurement module such as a global positioning system (GPS).

Referring to FIG. 13, the electronic device determines to start a location search task in step 1305 and reports its state information to a mobile terminal in step 1310. In step 1315, the electronic device determines whether a task execution indication has been received from the mobile terminal. If the task execution indication has not been received or a task move indication has been received, the electronic device determines a current location and generates a map image corresponding to the current location in step 1320. In step 1325, the electronic device displays the current location and the map image.

On the other hand, upon receipt of the task execution indication, the electronic device receives information about the current location and the map image from the mobile terminal in step 1330. In step 1325, the electronic device displays the current location and map image received from the mobile terminal.

Figure 14:
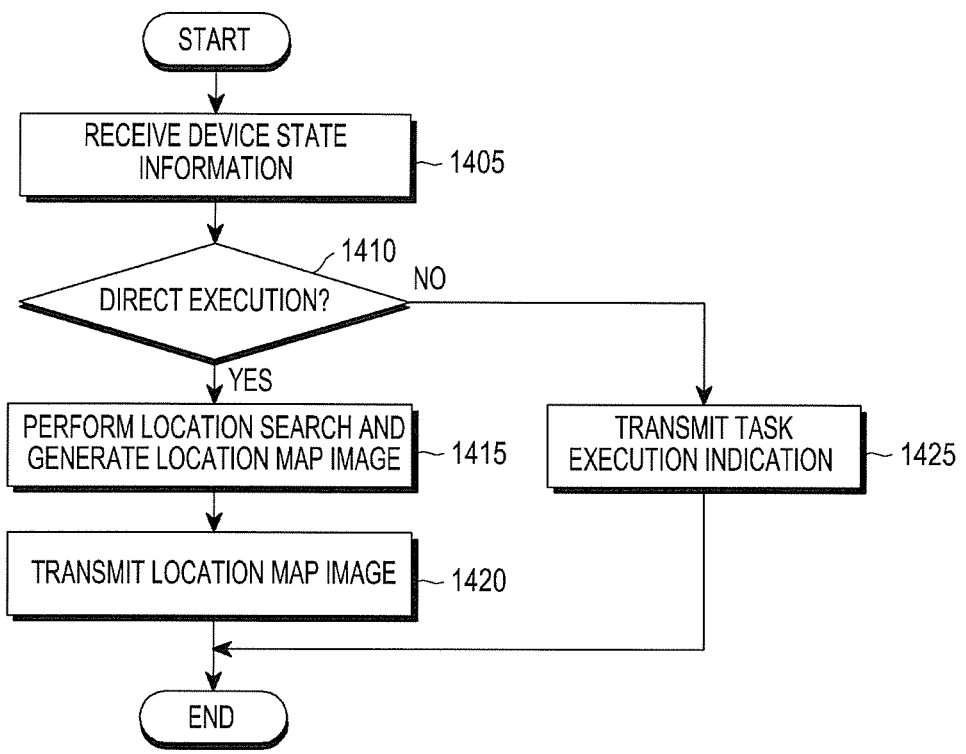
FIG. 14 is a flowchart illustrating an operation of a mobile terminal for executing a location search task according to an embodiment of the present disclosure.

FIG. 14 is a flowchart illustrating an operation of a mobile terminal for executing a location search task according to an embodiment of the present disclosure.

Referring to FIG. 14, the mobile terminal receives state information from an electronic device interacting with the mobile terminal through a network in step 1405. The state information is received together with a request for executing a location search task. In step 1410, the mobile terminal determines whether to execute the location search task directly, in consideration of the state of the mobile terminal and the state of the electronic device. If determining to execute the location search task directly, the mobile terminal determines a current location and generates a map image corresponding to the current location in step 1415 and transmits information about the current location and the map image to the electronic device in step 1420.

On the other hand, if the mobile terminal determines not to execute the location search task directly, the mobile terminal transmits a task execution indication to the electronic device in step 1425.

Figure 15:
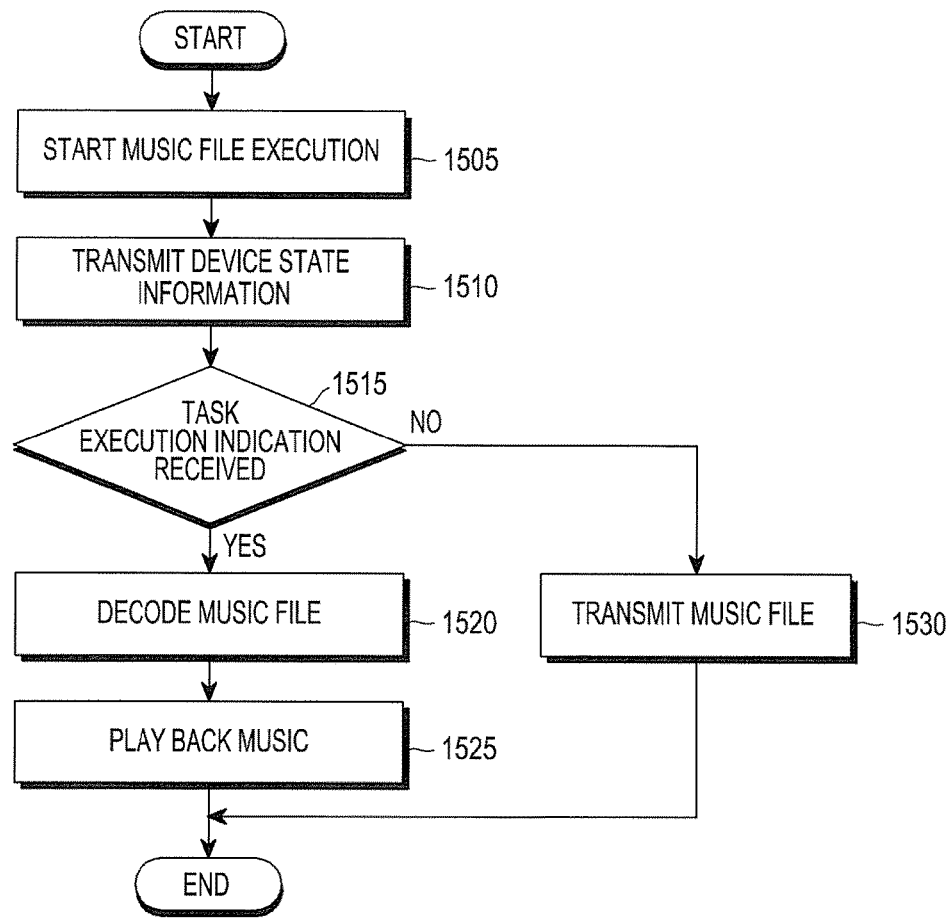
FIG. 15 is a flowchart illustrating an operation of an electronic device for executing a music decoding task according to an embodiment of the present disclosure.

FIG. 15 is a flowchart illustrating an operation of an electronic device that executes a music decoding task according to an embodiment of the present disclosure. In the illustrated example, the electronic device is a wearable device capable of playing back music.

Referring to FIG. 15, the electronic device determines to play back a music file in step 1505 and reports its state information to a mobile terminal in step 1510. In step 1515, the electronic device determines whether a task execution indication has been received from the mobile terminal. If the task execution indication has not been received or a task move indication has been received, the electronic device transmits a music file requested for playback to the mobile terminal in step 1520. On the other hand, upon receipt of the task execution indication, the electronic device decodes the music file in step 1520 and plays back and outputs the decoded music file in step 1525.

Figure 16:
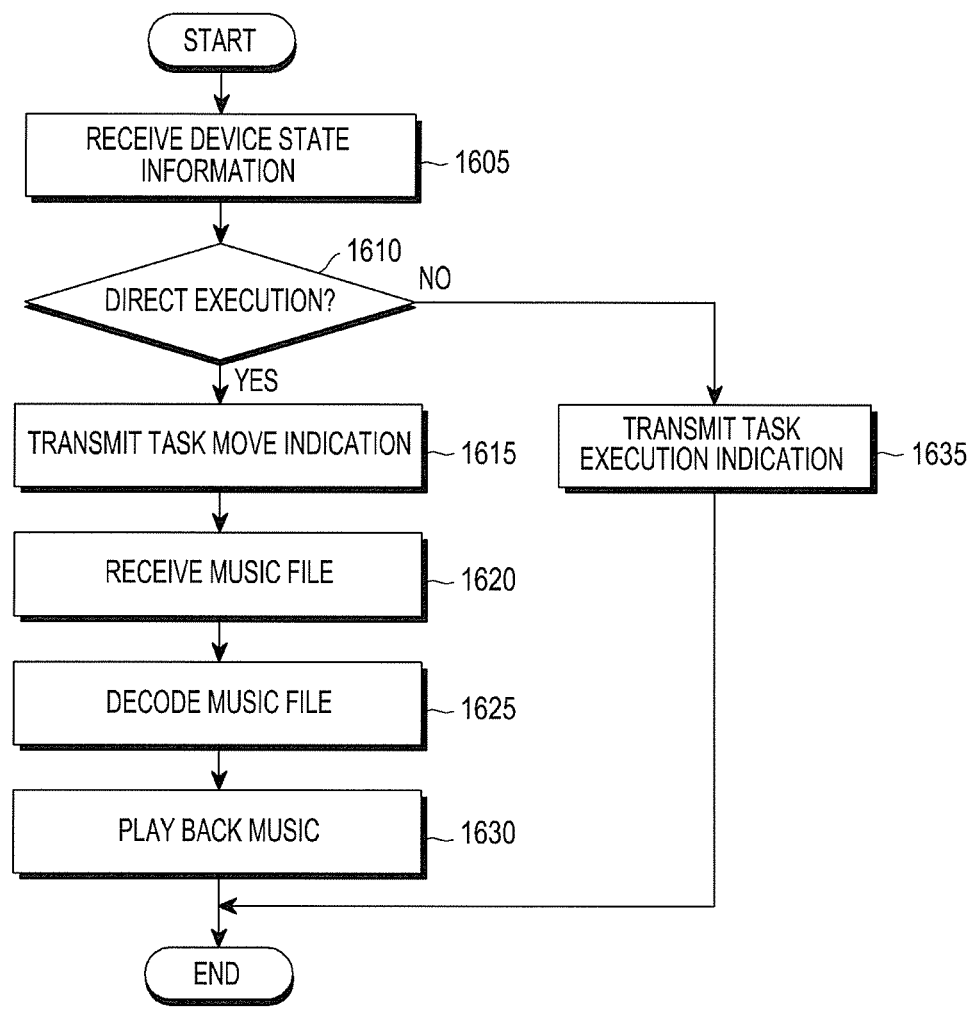
FIG. 16 is a flowchart illustrating an operation of a mobile terminal for executing a music decoding task according to an embodiment of the present disclosure.

FIG. 16 is a flowchart illustrating an operation of a mobile terminal for executing a music decoding task according to an embodiment of the present disclosure.

Referring to FIG. 16, the mobile terminal receives state information from an electronic device interacting with the mobile terminal through a network in step 1605. The state information is received together with a request for executing a music decoding task. In step 1610, the mobile terminal determines whether to execute the music decoding task directly, in consideration of the state of the mobile terminal and the state of the electronic device. If determining to execute the music decoding task directly, the mobile terminal requests a music file to the electronic device by transmitting a task move indication to the electronic device in step 1615 and receives the music file requested for playback from the electronic device in step 1620. The mobile terminal decodes the music file in step 1625 and plays back and outputs the decoded music file in step 1630.

On the other hand, if the mobile terminal determines not to execute the music decoding task directly, the mobile terminal transmits a task execution indication to the electronic device in step 1635.

While not shown, when the electronic device is initially connected to the mobile terminal, the electronic may ask the mobile terminal whether to execute the music decoding task, and the mobile terminal may determine a device that will execute the music decoding task according to the performance of the mobile terminal and the electronic device in another embodiment.

In another embodiment, upon initial sensing of a connection to the electronic device, upon receipt of a user request for changing a setting, or upon installation of an application for interaction with the electronic device, the mobile terminal determines whether the mobile terminal or the smart watch is to execute the music decoding task.

As is apparent from the forgoing description of the embodiments of the present disclosure, the power consumption of an electronic device and/or a mobile terminal is reduced and a data processing task can be efficiently executed.

Various embodiments of the present disclosure could be implemented as computer-readable code in a computer-readable recording medium. The computer-readable recording medium could include any kind of recording device storing computer-readable data. Examples of the recording medium may include read only memory (ROM), random access memory (RAM), compact disk-read only memory (CD-ROM), magnetic tape, floppy disk, optical data storage device, and carrier waves (such as, transmission over the Internet). In addition, the computer-readable recording medium could be distributed over the computer systems connected over the network, and computer-readable codes could be stored and executed in a distributed manner. Functional programs, code, and code segments to realize the embodiments herein could be construed by one of ordinary skill in the art.

The method and apparatus according to various embodiments of the present disclosure could be implemented in hardware, software, or a combination of hardware and software. The software may be stored, for example, irrespective of erasable or rewritable, in a volatile or non-volatile storage device such as a storage device like ROM, a memory such as RAM, a memory chip, or an integrated circuit (IC), or an optically or magnetically writable and machine-readable (such as, computer-readable) storage medium such as CD, digital versatile disk (DVD), or magnetic tape. The method according to various embodiments of the present disclosure could be implemented in a computer or portable terminal including a controller and a memory. The memory is an example of a machine-readable storage medium suitable for storing a program or programs including instructions that implement embodiments of the present disclosure.

Accordingly, the present disclosure includes a program including code for implementing the apparatuses or methods as disclosed in the claims and a machine (or computer)-readable storage medium that stores the program. Also, this program could be electronically transferred through a medium such as a communication signal transmitted by wired or wireless connection and the present disclosure includes its equivalents appropriately.

The apparatus according to various embodiments of the present disclosure could receive a program from a wiredly or wirelessly connected program providing device and store the program. The program providing device could include a program having instructions for implementing a predetermined content protection method by a graphic processing device, a communication unit for conducting wired or wireless communication with the graphic processing device, and a controller for transmitting the program to the transmission and reception device upon request of the graphic processing device or automatically.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for executing a task of an electronic device, the apparatus comprising:
a communication interface configured to:
receive state information associated with the electronic device from the electronic device, and
receive a raw file of an image from the electronic device; and
a processor configured to:
identify the state information associated with the electronic device and state information associated with a mobile terminal, the state information including a plurality of states of the electronic device and the mobile terminal,
identify whether a user-defined policy is predetermined, wherein the user-defined policy indicates which state among the plurality of states is considered first,
in a case that the user-defined policy is predetermined, determine whether to execute a specific task in the electronic device or the mobile terminal by taking consideration of the user-defined policy based on the state information,
in a case that the user-defined policy is not predetermined, determine whether to execute a specific task in the electronic device or the mobile terminal by taking consideration of a network state-based policy, and
indicate a result of the determination to the electronic device through a communication interface,
wherein the user-defined policy is set on an electronic device basis or a task basis,
wherein the network state-based policy is determined by using weight assigned to the electronic device or the mobile terminal, the weight being calculated based on a state of a network connected to the electronic device or the mobile terminal,
wherein the processor further configured to encode the raw file of the image, and
wherein the communication interface further configured to transmit, to the electronic device, the encoded raw file of the image.

2. The apparatus of claim 1, wherein the state information associated with the electronic device and the mobile terminal includes information about at least one of a battery state, processor performance state, and a communication state.

3. The apparatus of claim 1, wherein the task includes at least one of a task of encoding an image captured by the electronic device, a task of generating a map image corresponding to a current location, and a task of decoding a music file stored in the electronic device.

4. The apparatus of claim 1, wherein the processor is configured to determine a device that includes a higher residual battery power to execute the task, and wherein the device is the electronic device or the mobile terminal.

5. The apparatus of claim 1, wherein the processor is further configured to determine a device that includes a higher residual battery power and a lower processor use rate to execute the task, wherein the device is the electronic device or the mobile terminal.

6. The apparatus of claim 1, wherein the processor is further configured to:
receive a request for executing a location search task from the electronic device through the communication interface;
determine a current location;
generate a map image corresponding to the current location; and
transmit information associated with the current location and the map image to the electronic device through the communication interface.

7. The apparatus of claim 1, wherein the processor is further configured to:
receive a request for executing a music decoding task from the electronic device through the communication interface;
request a music file to the electronic device in response to the request for executing the music decoding task;
receive the music file from the electronic device through the communication interface; and
play back the music file by decoding the music file.

8. The apparatus of claim 1, wherein the state of the network includes at least one of a use period, a number of electronic devices connected to the mobile terminal, and a distance between the electronic device and the mobile terminal.

9. An apparatus for executing a task of an electronic device, the apparatus comprising:
a communication interface configured to report, to a mobile terminal, state information associated with the electronic device; and
a processor configured to:
execute a task in accordance with a policy of the electronic device, upon receipt of a task execution indication from the mobile terminal, the policy being selected among a network state-based policy and a user-defined policy; and
transmit, to the mobile terminal, data associated with the task to enable the mobile terminal to execute the task, if the task execution indication is not received from the mobile terminal,
wherein the task execution indication is determined by taking consideration of the user-defined policy in a case that the user-defined policy is predetermined,
wherein the task execution indication is determined by taking consideration of the network state-based policy in a case that the user-defined policy is not predetermined, wherein the state information includes a plurality of states of the electronic device and the mobile terminal,
wherein the user-defined policy indicates which state among the plurality of states is considered first,
wherein the user-defined policy is set on an electronic device basis or a task basis,
wherein the network state-based policy is determined by weights assigned to the electronic device or the mobile terminal, the weights being calculated based on a state of a network connected to the electronic device or the mobile terminal, and
wherein the processor is further configured to:
receive, from the mobile terminal through the communication interface, a request for a raw file of an image captured by the electronic device; and
transmit, to the mobile terminal through the communication interface, the raw file of the image.

10. The apparatus of claim 9, wherein the state information associated with the electronic device and the mobile terminal includes information about at least one of a battery state, processor performance state, and a communication state.

11. The apparatus of claim 9, wherein the task includes at least one of a task of encoding an image captured by the electronic device, a task of generating a map image corresponding to a current location, and a task of decoding a music file stored in the electronic device.

12. The apparatus of claim 9, wherein the processor is further configured to receive information associated with a current location and a map image corresponding to the current location through the communication interface and display the current location and the map image.

13. The apparatus of claim 9, wherein the processor is further configured to receive a request for a music file for a music file decoding task from the mobile terminal through the communication interface and transmit the music file to the mobile terminal through the communication interface.

14. The apparatus of claim 9, wherein the state of the network includes at least one of a use period, a number of electronic devices connected to the mobile terminal, and a distance between the electronic device and the mobile terminal.

15. A method for executing a task of an electronic device, the method comprising:
receiving state information associated with the electronic device from the electronic device;
receiving a raw file of an image from the electronic device;
identifying the state information associated with the electronic device and state information associated with a mobile terminal, the state information including a plurality of states of the electronic device and the mobile terminal;
identifying whether a user-defined policy is predetermined, wherein the user-defined policy indicates which state among the plurality of states is considered first;
in a case that the user-defined policy is predetermined, determining whether to execute a specific task in the electronic device or the mobile terminal by taking consideration of the user-defined policy based on the state information;
in a case that the user-defined policy is not predetermined, determining whether to execute a specific task in the electronic device or the mobile terminal by taking consideration of a network state-based policy; and
indicating a result of the determination to the electronic device,
wherein the user-defined policy is set on an electronic device basis or a task basis,
wherein the network state-based policy is determined by weights assigned to the electronic device or the mobile terminal, the weights being calculated based on a state of a network connected to the electronic device or the mobile terminal, and
wherein executing the task includes encoding the raw file of the image and transmitting, to the electronic device, the encoded raw file of the image.

16. The method of claim 15, wherein the state information associated with the electronic device and the mobile terminal includes information about at least one of a battery state, processor performance state, and a communication state.

17. The method of claim 15, wherein the task includes at least one of a task of encoding an image captured by the electronic device, a task of generating a map image corresponding to a current location, and a task of decoding a music file stored in the electronic device.

18. The method of claim 15, wherein the determination further includes determining a device that includes a higher residual battery power to execute the task, and wherein the device is the electronic device or the mobile terminal.

19. The method of claim 15, wherein the determination further includes determining a device that includes a higher residual battery power and a lower processor use rate to execute the task, and wherein the device is the electronic device or the mobile terminal.

20. The method of claim 15, further comprising:
receiving a request for executing a location search task from the electronic device;
determining a current location;
generating a map image corresponding to the current location; and
transmitting information associated with the current location and the map image to the electronic device.

21. The method of claim 15, further comprising:
receiving a request for executing a music decoding task from the electronic device;
requesting a music file to the electronic device in response to the request for executing the music decoding task;
receiving the music file from the electronic device; and
playing back the music file by decoding the music file.

22. A method for executing a task of an electronic device, the method comprising:
reporting, to a mobile terminal, state information associated with the electronic device;
executing a task in accordance with a policy of the electronic device, upon receipt of a task execution indication from the mobile terminal, the policy being selected among a network state-based policy and a user-defined policy; and
transmitting, to the mobile terminal, data associated with the task to enable the mobile terminal to execute the task, if the task execution indication is not received from the mobile terminal,
wherein the task execution indication is determined by taking consideration of the user-defined policy in a case that the user-defined policy is predetermined,
wherein the task execution indication is determined by taking consideration of the network state-based policy in a case that the user-defined policy is not predetermined,
wherein the state information includes a plurality of states of the electronic device and the mobile terminal,
wherein the user-defined policy indicates which state among the plurality of states is considered first, wherein the user-defined policy is set on an electronic device basis or a task basis, wherein the network state-based policy is determined by weights assigned to the electronic device or the mobile terminal, the weights being calculated based on a state of a network connected to the electronic device or the mobile terminal, and wherein the electronic device receives, from the mobile terminal, a request for a raw file of an image and transmits, to the mobile terminal, the raw file of the image in a case that the task includes encoding the image.

23. The method of claim 22, wherein the state information associated with the electronic device and the mobile terminal includes information about at least one of a battery state, processor performance state, and a communication state.

24. The method of claim 22, wherein the task includes at least one of a task of encoding an image captured by the electronic device, a task of generating a map image corresponding to a current location, and a task of decoding a music file stored in the electronic device.

25. The method of claim 22, further comprising:
receiving information associated with a current location and a map image corresponding to the current location; and
displaying the current location and the map image.

26. The method of claim 22, further comprising:
receiving a request for a music file for a music file decoding task from the mobile terminal; and
transmitting the music file to the mobile terminal.

* * * * *

UNITED STATES PATENT AND TRADEMARK OFFICE
CERTIFICATE OF CORRECTION

PATENT NO. : 10,277,712 B2
APPLICATION NO. : 14/956234
DATED : April 30, 2019
INVENTOR(S) : Won-Jin Kim et al.

Page 1 of 1

It is certified that error appears in the above-identified patent and that said Letters Patent is hereby corrected as shown below:

On the Title Page

Item (30):
The Foreign Application Priority Data is missing. The Foreign Application Priority Data should read:
-- Dec. 01, 2014 (KR) ............ 10-2014-0169897 --

Signed and Sealed this
Third Day of September, 2019

Andrei Iancu
*Director of the United States Patent and Trademark Office*